United States Patent
Sauer et al.

(10) Patent No.: US 10,178,932 B2
(45) Date of Patent: *Jan. 15, 2019

(54) VACUUM CLEANER FILTER BAG

(75) Inventors: Ralf Sauer, Overpelt (BE); Jan Schultink, Overpelt (BE)

(73) Assignee: Eurofilters Holding N.V., Overpelt (BE)

(*) Notice: Subject to any disclaimer, the term of this patent is extended or adjusted under 35 U.S.C. 154(b) by 1171 days.

This patent is subject to a terminal disclaimer.

(21) Appl. No.: 13/635,001

(22) PCT Filed: Mar. 9, 2011

(86) PCT No.: PCT/EP2011/001165
§ 371 (c)(1),
(2), (4) Date: Nov. 29, 2012

(87) PCT Pub. No.: WO2011/113544
PCT Pub. Date: Sep. 22, 2011

(65) Prior Publication Data
US 2013/0061566 A1    Mar. 14, 2013

(30) Foreign Application Priority Data

Mar. 19, 2010  (EP) .................................. 10002964
May 20, 2010  (EP) .................................. 10163462
May 20, 2010  (EP) .................................. 10163463

(51) Int. Cl.
*A47L 9/14*   (2006.01)
*B01D 46/52*  (2006.01)
*A47L 11/40*  (2006.01)

(52) U.S. Cl.
CPC ............. *A47L 9/14* (2013.01); *A47L 9/1436* (2013.01); *A47L 11/4019* (2013.01); *B01D 46/523* (2013.01)

(58) Field of Classification Search
CPC ....... B01D 46/523; B01D 46/521; A47L 9/14; A47L 9/1436
(Continued)

(56) References Cited

U.S. PATENT DOCUMENTS 1,859,861 A * 5/1932 Ballou ...................... A47L 9/14
                                                         55/368
1,878,384 A * 9/1932 Davidson .................. A47L 9/14
                                                         55/365
(Continued)

FOREIGN PATENT DOCUMENTS

CN    101360443 A    2/2009
DE      484759 C *  10/1929  ............... A47L 9/14
(Continued)

OTHER PUBLICATIONS

Abhisehk et al, "Design of Pleated Filter Bag Filter System for Particulate Emission Control in Cement Industry", Aug. 2015, International Research Journal of Engineering and Technology, vol. 2, Issue 5.*
(Continued)

*Primary Examiner* — Robert Clemente
(74) *Attorney, Agent, or Firm* — Brinks Gilson & Lione

(57) ABSTRACT

The invention relates to a vacuum cleaner filter bag, including a first bag wall containing a filter material and a second bag wall containing a filter material. The first and the second bag walls are joined together along the periphery thereof such that the vacuum cleaner filter bag is completely closed. The filter material of the first and the second bag walls is made of a non-woven fabric. The vacuum cleaner filter bag includes an inlet through which the air which is to be filtered can flow into the vacuum cleaner filter bag, also including a
(Continued)

retaining plate. The vacuum cleaner filter bag is characterized in that the first and/or the second bag wall includes at least five folds.

16 Claims, 9 Drawing Sheets

(58) Field of Classification Search
USPC ......... 55/309, 367, 368, 372, 374, 382, 486, 55/521, DIG. 2, DIG. 5; 15/347, 352, 15/353; 96/222, 223, 226, 227; 156/515, 156/518, 530, 581
See application file for complete search history.

(56) References Cited

U.S. PATENT DOCUMENTS

| | | | | |
|---|---|---|---|---|
| 2,514,280 | A * | 7/1950 | Hammell | A47L 9/14 15/327.1 |
| 3,107,989 | A | 10/1963 | Fesco | |
| 3,416,721 | A | 12/1968 | Fesco | |
| 3,430,843 | A | 3/1969 | Fesco | |
| 3,596,443 | A | 8/1971 | Goldberg | |
| 3,710,948 | A * | 1/1973 | Sexton | B01D 46/02 210/484 |
| 4,125,219 | A * | 11/1978 | Engen | A47L 9/14 55/382 |
| 4,145,196 | A * | 3/1979 | Alskog | B01D 46/02 210/315 |
| 4,539,027 | A | 9/1985 | Fornas et al. | |
| 4,746,339 | A * | 5/1988 | Millard | B01D 46/0001 210/493.2 |
| 5,181,946 | A * | 1/1993 | Bosses et al. | 55/381 |
| 5,401,446 | A | 3/1995 | Tsai et al. | |
| 6,156,086 | A * | 12/2000 | Zhang | A47L 9/14 428/36.1 |
| 6,802,879 | B2 | 10/2004 | Scanlon | |
| 6,814,773 | B2 * | 11/2004 | Shah | B01D 46/0004 55/496 |
| 7,018,493 | B2 * | 3/2006 | Altmeyer et al. | 156/73.1 |
| 7,611,555 | B2 | 11/2009 | Wattenberg et al. | |
| 7,799,107 | B2 | 9/2010 | Corney et al. | |
| 7,981,177 | B2 * | 7/2011 | Ogale | 55/382 |
| 8,062,396 | B2 * | 11/2011 | Amano | B01D 39/1623 55/302 |
| 8,066,803 | B2 * | 11/2011 | Sauer | A01N 25/34 55/382 |
| 8,097,054 | B2 * | 1/2012 | Schultink | A47L 9/14 15/347 |
| 8,157,881 | B1 * | 4/2012 | Anoszko | B01D 46/0005 55/481 |
| 8,372,174 | B2 * | 2/2013 | Schultink et al. | 55/365 |
| 8,702,827 | B2 * | 4/2014 | Schultink et al. | 55/309 |
| 8,702,828 | B2 * | 4/2014 | Schultink et al. | 55/309 |
| 8,758,465 | B2 | 6/2014 | Schultink et al. | |
| 2002/0011051 | A1 * | 1/2002 | Schultheib | B01D 39/1623 55/382 |
| 2002/0166449 | A1 * | 11/2002 | Scanlon | 95/273 |
| 2004/0157045 | A1 | 8/2004 | Davenport | |
| 2005/0204714 | A1 * | 9/2005 | Sundet | B01D 46/0001 55/497 |
| 2006/0005518 | A1 * | 1/2006 | Duffy | B01D 46/523 55/497 |
| 2006/0102275 | A1 | 5/2006 | Poulsen | |
| 2006/0144042 | A1 * | 7/2006 | Kadlicko | F04B 1/145 60/487 |
| 2008/0017036 | A1 | 1/2008 | Schultink et al. | |
| 2008/0047430 | A1 * | 2/2008 | Kobori | D04H 1/54 95/283 |
| 2008/0099053 | A1 * | 5/2008 | Loveless | A47L 7/0004 134/21 |
| 2008/0115671 | A1 * | 5/2008 | Sauer | A01N 25/34 96/223 |
| 2008/0257149 | A1 | 10/2008 | Ogale | |
| 2008/0314005 | A1 * | 12/2008 | Sauer | A47L 9/14 55/368 |
| 2008/0314011 | A1 * | 12/2008 | Smithies | B01D 39/1623 55/521 |
| 2009/0301043 | A1 * | 12/2009 | Rosemeier | A47L 9/14 55/382 |
| 2009/0308032 | A1 * | 12/2009 | Schultink | A47L 9/14 55/382 |
| 2011/0047945 | A1 * | 3/2011 | Schultink | A47L 9/102 55/368 |
| 2011/0206564 | A1 * | 8/2011 | Parent | B01D 39/1623 422/177 |
| 2011/0265283 | A1 * | 11/2011 | Duncan | A47L 9/14 15/347 |
| 2012/0005997 | A1 * | 1/2012 | Davies | B01D 46/023 55/381 |
| 2013/0047563 | A1 * | 2/2013 | Sauer et al. | 55/378 |

FOREIGN PATENT DOCUMENTS

| | | | | |
|---|---|---|---|---|
| DE | 656164 C * | 1/1938 | | A47L 9/125 |
| DE | 1403128 A1 * | 11/1968 | | A47L 9/14 |
| DE | 1503726 A1 * | 5/1969 | | A47L 9/14 |
| DE | 1703030 A1 * | 1/1972 | | A47L 9/0072 |
| DE | 3 129 371 A1 | 2/1983 | | |
| DE | 4227744 A1 | 2/1994 | | |
| DE | 297 04 079 U1 | 6/1997 | | |
| DE | 197 13 238 A1 | 10/1998 | | |
| DE | 298 14 830 U1 | 11/1998 | | |
| DE | 198 20 153 C1 | 12/1999 | | |
| DE | 201 01 466 U1 | 5/2001 | | |
| DE | 100 64 608 A1 | 4/2002 | | |
| DE | 20 2005 000 918 U1 | 5/2005 | | |
| DE | 103 48 375 A1 | 5/2005 | | |
| DE | 10 2004 009 956 A1 | 9/2005 | | |
| DE | 20 2005 010 357 U1 | 10/2005 | | |
| DE | 20 2005 016309 U1 | 1/2006 | | |
| DE | 20 2006 016 303 U1 | 1/2007 | | |
| DE | 20 2006 016 304 U1 | 1/2007 | | |
| DE | 20 2006 019 108 U1 | 3/2007 | | |
| DE | 20 2007 000 198 U1 | 4/2007 | | |
| DE | 20 2005 021300 U1 | 8/2007 | | |
| DE | 20 2007 010 692 U1 | 11/2007 | | |
| DE | 10 2006 023 707 B3 | 1/2008 | | |
| DE | 102006023707 B3 * | 1/2008 | | A47L 9/14 |
| DE | 102006051117 B3 * | 1/2008 | | A47L 9/14 |
| DE | 20 2008 003248 U1 | 6/2008 | | |
| DE | 20 2008 007 717 U1 | 9/2008 | | |
| DE | 202008008989 U1 * | 9/2008 | | A47L 9/14 |
| DE | 20 2008 016 300 U1 | 4/2009 | | |
| DE | 10 2007 060 747 A1 | 6/2009 | | |
| DE | 10 2007 060 748 A1 | 6/2009 | | |
| DE | 20 2009 004 433 U1 | 7/2009 | | |
| DE | 10 2008 006769 A1 | 8/2009 | | |
| DE | 20 2008 006 904 U1 | 11/2009 | | |
| DE | 20 2009 002 970 U1 | 11/2009 | | |
| DE | 20 2009 013081 U1 | 12/2009 | | |
| DE | 20 2009 012 839 U1 | 1/2010 | | |
| DE | 102008045683 A1 * | 3/2010 | | A47L 9/14 |
| DE | 102009009152 A1 * | 8/2010 | | A47L 9/14 |
| EP | 0 161 790 A2 | 11/1985 | | |
| EP | 0 338 479 A1 | 10/1989 | | |
| EP | 0 639 061 B1 | 5/1997 | | |
| EP | 0 898 997 A1 | 3/1999 | | |
| EP | 0 960 645 A2 | 12/1999 | | |
| EP | 1 059 056 A1 | 12/2000 | | |
| EP | 1 080 770 A2 | 3/2001 | | |
| EP | 1 192 890 A2 | 4/2002 | | |
| EP | 1 212 971 A2 | 6/2002 | | |
| EP | 1 661 500 A1 | 5/2006 | | |
| EP | 1 683 460 A1 | 7/2006 | | |
| EP | 1 776 909 A1 | 4/2007 | | |
| EP | 1 787 560 A1 | 5/2007 | | |
| EP | 1 849 392 A1 | 10/2007 | | |
| EP | 1 915 938 A1 | 4/2008 | | |
| EP | 1 982 625 A2 | 10/2008 | | |
| EP | 2 067 427 A2 | 6/2009 | | |

(56) References Cited

FOREIGN PATENT DOCUMENTS

| EP | 2 098 153 A1 | 9/2009 | |
|----|----|----|----|
| EP | 2133017 A1 * | 12/2009 | ............... A47L 9/14 |
| EP | 2215951 B1 * | 1/2012 | ............. A47L 9/102 |
| EP | 2489292 A1 * | 8/2012 | ............... A47L 9/14 |
| EP | 2311360 B1 * | 9/2014 | ............... A47L 9/14 |
| EP | 2452603 B1 * | 10/2015 | ............... A47L 9/14 |
| GB | 879188 A | 10/1961 | |
| GB | 1 594 700 | 8/1981 | |
| JP | 2000 350685 A | 12/2000 | |
| JP | 2001 204661 A1 | 7/2001 | |
| WO | WO 95/16383 A1 | 6/1995 | |
| WO | WO 00/00269 A1 | 1/2000 | |
| WO | WO 00/64320 A1 | 11/2000 | |
| WO | WO 2005/034708 A1 | 4/2005 | |
| WO | WO 2005/060807 A1 | 7/2005 | |
| WO | WO 2006/025249 A1 | 3/2006 | |
| WO | WO 2007/059939 A1 | 5/2007 | |
| WO | WO 2010/000453 A1 | 1/2010 | |

OTHER PUBLICATIONS

Chen et al, "Optimization of Pleated Filter Designs Using a Finite-Element Numerical Model", 1995, Aerosol Science and Technology 23, pp. 579-590.*

Wiegmann et al, "Design of Pleated Filters by Computer Simulations", 2009.*

International Search Report for International Application No. PCT/EP2011/001165, dated Oct. 25, 2011.

* cited by examiner

VACUUM CLEANER FILTER BAG

This application claims the benefit under 35 U.S.C. § 371 of International Application No. PCT/EP2011/001165, filed Mar. 9, 2011, which claims the benefit of European Patent Application No. 10002964.4, filed Mar. 19, 2010, European Patent Application No. 10163462.4, filed May 20, 2010, and European Patent Application No. 10163463.2, filed May 20, 2010, which are incorporated by reference herein in their entirety.

FIELD OF THE INVENTION

The invention relates to a vacuum cleaner filter bag with a first bag wall comprising a filter material and a second bag wall comprising a filter material, whereby the first and the second bag wall are connected to each other along their periphery such that the vacuum cleaner filter bag is completely closed, whereby the filter material of the first and of the second bag wall is formed from a nonwoven, and whereby the vacuum cleaner filter bag has an inlet opening, through which the air to be cleaned can flow into the vacuum cleaner filter bag, and a retaining plate.

STATE OF THE ART

Vacuum cleaner filter bags are predominantly made of nonwovens today. Due to their excellent dust-holding capacity, vacuum cleaner filter bags made of nonwovens have almost completely replaced filter bags made of paper, such as are known, for example, from U.S. Pat. No. 3,596,443. The manufacture of filter bags made of nonwovens fundamentally differs from the manufacture of paper bags. Manufacturing methods and features of filter bags made of paper can generally therefore not be applied to filter bags made of nonwovens.

So-called flat bags are most common for vacuum cleaner filter bags made of nonwovens. These are formed from a first or upper and a second or lower bag wall. The two bag walls can thereby be welded and/or glued to each other along their periphery by means of a seam. In the case of a rectangular flat bag, four weld and/or glue seams then form the connection between the first and the second bag wall. The seam can also be formed partially by simply folding a piece of filter material. For example, the upper and the lower bag wall can consequently be formed by means of folding a single piece of filter material along an axis of symmetry of the same and welding and/or gluing the two bag walls along the edges that are still open after the folding. In such a flat bag, the first and the second bag wall are connected by means of three weld and/or glue seams and a fold. Alternatively to this, first a tube can be formed from a piece of filter material by means of a so-called longitudinal weld seam and/or longitudinal glue seam, whereby this tube is closed perpendicularly to this weld seam and/or glue seam by two additional weld seams and/or glue seams. In this case, the first and the second bag wall are connected by means of two weld seams and/or glue seams and two folds. The longitudinal weld seam and/or longitudinal glue seam can hereby arbitrarily lie either in the first or in the second bag wall (a special case of this development would be that the longitudinal weld seam and/or longitudinal glue seam lies such that it connects the first and the second bag wall; this would then correspond to the previously described case, in which the first and the second bag wall are connected by three weld seams and/or glue seams and a fold).

Flat bags of that kind can be manufactured in a relatively simple manner, although fleece material is substantially more difficult to process than paper. Flat bags are known, for example, from DE 201 01 466, EP 0 161 790, EP 0 639 061, EP 1 059 056 or EP 1 661 500. Disadvantageous in these simple flat bags is that this bag type can adapt only inadequately to the installation space in the vacuum cleaner.

In order to achieve a better fitting to the installation space, flat bags with side foldings are used. These side foldings can also be formed such that they can be turned out.

The term "folding" is defined in the context of the present invention as a sequence of two or more folds, whereby in the context of the present invention, each single fold is defined by two fold legs and a fold closure.

FIGS. 12a, 12b and 12c show how side foldings are formed according to the state of the art.

FIG. 12a shows a side folding 1200a, such as is disclosed in EP 1 683 460. The vacuum cleaner filter bag according to FIG. 12a consists of a first or upper bag wall 1201a and a second or lower bag wall 1202a. These two bag walls are connected to each other by means of a weld seam 1203a. Three folds I, II and III are provided to form the side folding. Both fold legs of the fold 11210a and 1211a are formed by the first bag wall, and the fold closure SI of the fold I lies in the first bag wall. Both fold legs of the fold III 1212a and 1213a are formed by the second bag wall, and the fold closure SIII of the fold III lies in the second bag wall. The first fold leg of the fold 111211a is formed by the first bag wall (and it corresponds to the second fold leg of the fold I). The second fold leg of the fold II 1212a is formed by the second bag wall (and it corresponds to the first fold leg of the fold III). The fold closure SII of the fold II runs along the weld seam 1203a.

FIG. 12b shows a side folding 1200b according to DE 10 2008 006 769. The vacuum cleaner filter bag according to FIG. 12b consists of a first or upper bag wall 1201b and a second or lower bag wall 1202b. Three folds I, II and III are provided to form the side folding. Both fold legs of the fold 11210b and 1211b are formed by the first bag wall, and the fold closure SI of the fold I lies in the first bag wall. Both fold legs of the fold III 1212b and 1213b are formed by the second bag wall, and the fold closure SIII of the fold III runs along the weld seam 1203b. The connection between the first or upper bag wall of the vacuum cleaner filter bag and the second or lower bag wall of the vacuum cleaner filter bag is implemented in the depicted design by means of a fold, namely the fold II with its first fold leg 1211b (which corresponds to the second fold leg of the fold I) and its second fold leg 1212b (which corresponds to the first fold leg of the fold III).

FIG. 12c shows a further alternative to the formation of a side fold 1200c according to the state of the art. The vacuum cleaner filter bag according to FIG. 12c likewise consists of a first or upper bag wall 1201c and a second or lower bag wall 1202c. Three folds I, II and III are likewise provided to form the side folding. Both fold legs of the fold 11210c and 1211c are formed by the upper bag wall, and the fold closure SI of the fold I lies in the upper bag wall. Both fold legs of the fold III 1212c and 1213c are formed by the lower bag wall, and the fold closure SIII of the fold III lies in the lower bag wall. The first fold leg of the fold II 1211c is formed by the upper bag wall (and it corresponds to the second fold leg of the fold I). The second fold leg of the fold II 1212c is formed by the lower bag wall (and it corresponds to the first fold leg of the fold III). The fold legs of the fold II and consequently the upper and the lower bag wall are connected to each other by means of the fold closure SII. The weld seam 1203a lies in the lower bag wall.

In order for it to be possible for the flat bag to fill efficiently with dust, it must be manufactured from a flexible filter material. Because if the filter material is too stiff, the bag cannot unfold during use and it cannot provide a sufficient volume for the dust that is to be held. If the vacuum cleaner filter bag is to have a side fold, the filter material must furthermore be flexible in order for it to be possible in general to provide such a side fold and also for it to be possible for this side fold to unfold again during use.

Furthermore, the flexibility of the filter material also simplifies the packaging of such vacuum cleaner filter bags. Vacuum cleaner filter bags of different sizes (for different vacuum cleaner models) can consequently be folded together in such a way that they can be offered in packages with the same dimensions in spite of their different dimensions, which leads to considerable advantages for warehousing and for the presentation in the salesroom.

Various measures have been proposed to improve the dust-holding capacity of filter bags. Multi-layer filter media made of nonwovens are known from EP 0 960 645. A pre-filtration by means of loose fibres is disclosed, for example, in DE 10 2007 060 747, DE 20 2007 010 692 and WO 2005/060807. A pre-filtration by means of a filter bag in a filter bag was disclosed by WO 2010/000453, DE 20 2009 002 970 and DE 20 2006 016 303. Flow deflections or flow distributions in the filter bag are proposed, for example, by EP 1 915 938, DE 20 2008 016 300, DE 20 2008 007 717, DE 20 2006 019 108, DE 20 2006 016 304, EP 1 787 560 and EP 1 804 635. DE 10 2007 060 748 discloses a filter bag in which the fleece material is stretched to form a three-dimensionally shaped bag wall. EP 1 982 625 discloses a filter bag, whereby the filter is embossed at least in areas and the effective filter area is enlarged by means of a profiling of the filter material. The profiling can be executed in the form of elongated ribs arranged parallel to one another. By means of the embossing with a pattern of this kind, the material characteristics and/or the filtration characteristics of the embossed nonwoven layer are modified. DE 20 2005 010 357 discloses a vacuum cleaner filter bag, whereby the bag wall has at least one layer of filter material, whereby at least one layer consists of creped fibre material. A coarse filter layer, a fine filter layer or all layers of the bag can thereby be creped. As a result of the creping, the at least one layer is irregularly creased, whereby the volume per surface unit of the corresponding filter layer is enlarged. As the result of such creping, the mass per unit area of the filter layer and consequently its filtration characteristics are modified.

Disadvantageous in the previously described vacuum cleaner filter bags is, however, that the volume flow of air to be cleaned that is conveyed through the vacuum cleaner still decreases substantially as the filling degree of the vacuum cleaner filter bag increases. The dust intake, and consequently the cleaning effect, of a vacuum cleaner is consequently substantially less in the case of a partially filled vacuum cleaner bag than in the case of a corresponding empty bag. This reduction in the suction power is especially pronounced in the case of filter bags with a high level of filtration efficiency (high level of particle retention or low penetration).

The object of the present invention is therefore to provide a vacuum cleaner filter bag through which the volume flow of air to be cleaned that is conveyed through the vacuum cleaner is reduced to a lesser extent than in the case of a vacuum cleaner filter bag according to the state of the art as the filling degree of the vacuum cleaner filter bag increases.

GENERAL DESCRIPTION OF THE INVENTION

The invention provides a vacuum cleaner filter bag with a first bag wall comprising a filter material and a second bag wall comprising a filter material, whereby the first and the second bag wall are connected to each other along their periphery such that the vacuum cleaner filter bag is completely closed, whereby the filter material of the first and of the second bag wall is formed from a nonwoven, whereby the vacuum cleaner filter bag has an inlet opening through which the air to be cleaned can flow into the vacuum cleaner filter bag and also has a retaining plate, and in which the first and/or second bag wall has at least five folds.

Surface foldings can be provided on the surface of the first and/or of the second bag wall by means of the at least five folds. The surface folding of the filter medium has significant advantages. Due to the surface folding, the area through which the air flows is substantially greater than the area that is regularly available for the air to flow through (airflow area). This can have a plurality of positive effects.

The service life of the filter is extended proportionally to the increase in area, because more filter material is available into which the dust can be deposited. The service life is thereby defined as the time after which a predetermined filter resistance (pressure loss) is reached. The increase in the pressure loss in the vacuum cleaner can be noticed as a reduction in the volume flow (vacuum flow) and finally as a loss in the cleaning effect.

The speed at which the air flows through the filter medium (called the media passage speed in the following) drops. In the case of a flat bag according to the state of the art with an area of 2×300 mm×320 mm and a volume flow of 35 l/s, the result is a media passage speed (ratio of the volume flow to the area of the vacuum cleaner filter bag through which the air flows) of 18.2 cm/s. In the case of a material thickness of 3.4 mm, the air consequently flows through the bag wall in approximately 0.019 s. A bag provided with folds according to the invention with comparable exterior dimensions can, for example, have a filter area of 2×300 mm×630 mm. In the case of a volume flow of 35 l/s, a media passage speed of 9.3 cm/s and a flow time of 0.034 now result. The lower media passage speed results in a lower pressure drop across the filter medium, i.e., the initial volume flow (without a dust load in the filter bag) is greater than in the case of a filter bag without the inventive folding. In other words, the rated input of the vacuum cleaner motor is more effectively converted into a high vacuum flow. If the cleaning power is the same, it is consequently possible to use a vacuum cleaner motor with lower power consumption.

The longer holding time of the particles in the filter, which is due to the lower media passage speed, leads to a greater probability of particle/fibre contacts. If one also uses an electrostatically charged filter medium in which the particles remain stably adhered to the staple fibres or filaments, a reduction in the media passage speed leads to disproportionately improved particle separation.

As already explained at the beginning, each fold, as the term is used in the context of the present invention, comprises two fold legs and a fold closure.

To be understood as a fold closure is the point of a fold having the lowest radius of curvature. A so-called fold axis is obtained by means of the intended connection of the fold closure. The fold axis is also called the fold back. The fold axis can correspond to the longitudinal axis of a fold.

Areas of a fold with a radius of curvature that is greater than the minimum radius of curvature of the fold are called fold legs. The area located between the fold legs of a fold is called the fold core.

The fold legs of a fold can consequently also have, in particular, a curvature.

Folds can also have inflection points. Inflection points are those points of a fold, particularly of the fold legs, at which the curvature of the fold changes from concave to convex. A connection line that connects a plurality of inflection points of a fold is called an inflection line.

Two adjacent folds can also share a fold leg. If a plurality of folds are provided in this way, a fold packet or a fold train can be implemented.

A plurality of folds can also be arranged in a zigzag manner.

The sequence of a plurality of folds is called a folding in the context of the present invention.

Foldings can also have legs that run parallel to the bag wall. Such legs can lie between folds that stick out of the bag wall plane and consequently have an upstream-side opening with reference to the bag wall. In particular, the width of the parallel leg can thereby be less than the width of the opening of the fold that sticks out from the bag wall, preferably less than a half, or most preferably less than a fourth, of this width.

The fold legs of the folds of the first and/or second bag wall can particularly be smooth. To be understood here by "smooth" is that the fold legs have no compactions and/or structuring, in particular such that are intended to stabilize the shape of the folds.

One or more fold legs of one or more folds of the first and/or of the second bag wall can comprise one or more embossed structures, in particular whereby the embossed structures are not used to stabilize the shape of the folds. In this way it is possible to achieve a further enlargement of the area available for filtration.

The first and/or the second bag wall can, in particular, have more than 5, 10, 20, 30, 40 or 50 folds, particularly also sequences of folds of these folds.

The folds of the first and/or second bag wall can be spaced apart at an essentially regular distance. In other words, the distance between the fold backs of two adjacent folds can be essentially constant.

Foldings in a reclined or upright position can be formed. To be understood as reclined foldings are foldings whose fold legs are arranged essentially parallel to the bag wall. To be understood as upright foldings are foldings whose fold legs, with the bag wall, enclose an angle greater than 0° and less than 180°, particularly greater than 20° or greater than 45°.

Also to be understood as an upright folding is a folding in which a plane in which both the fold axis and the inflection line of the fold lie encloses, with a flat, horizontal area on which the first and/or the second bag wall is arranged, an angle greater than 45°, particularly greater than 30°, particularly greater than 10°. In this case, a reclined folding can be understood as a folding in which the plane, with this surface, encloses an angle less than 45°, particularly less than 30°, particularly less than 10°.

To measure or determine the abovementioned angle, the vacuum cleaner filter bag, particularly the folded nonwoven material, is arranged on a flat, horizontal surface. For this purpose, the vacuum cleaner filter bag can also be cut open and, in particular, arranged on the surface in such a way that the upstream side or inner side of the original vacuum cleaner filter bag lies on the surface.

Reclined sequences of folds can be formed such that they overlap each other, do not overlap, and/or overlap partially.

The folded nonwoven material can comprise one or more layers of nonwoven material. In particular, a plurality of layers of nonwoven material can be folded together. In particular, the bag wall can also comprise a laminate made of a plurality of layers, particularly two or more layers, or it can consist of such a laminate.

For example, the laminate can be a spunbond—meltblown nonwoven—spunbond laminate (SMS laminate). It is also possible to use two or more meltblown layers (SMMS laminate, SnxMS laminate).

In principle, the bag wall can comprise embossed nonwoven material.

The retaining plate here is generally seen as an element of the vacuum cleaner filter bag, with the element being used to hold the vacuum cleaner filter bag in the interior of a vacuum cleaner housing. In particular, the retaining plate can be connected to the bag wall of the vacuum cleaner filter bag and be arranged in the area of an inlet opening. It can be advantageous to compress the bag wall having the foldings in a first step, for example, by means of ultrasonic welding, and to weld on the retaining plate in a second step. To hold the vacuum cleaner filter bag in a vacuum cleaner, the retaining plate is connected to a corresponding holder element of the vacuum cleaner, particularly in an engaged manner.

The retaining plate can fundamentally have any shape. For example, the retaining plate can be formed as a level, flat component such as that shown in EP 1 849 392. The retaining plate can also have a more complex structure, such as that shown in DE 20 2008 006 904.

The inlet opening and the retaining plate can be arbitrarily positioned on the surface of the bag wall of the vacuum cleaner filter bag. For example, the inlet opening and the retaining plate can be arranged centred on the vacuum cleaner filter bag.

According to a preferred further embodiment of the invention, the fold legs of the at least five folds have inflection lines that run essentially straight.

In contrast to a curved inflection line that leads to stabilizing the fold, an essentially straight inflection line results in a fold that remains unstiffened. In other words, the fold legs can be formed in such a way that the shape is not stabilized. As a result, the vacuum cleaner bag remains flexible and the folds can better adapt to the installation space of a vacuum cleaner.

According to another preferred further embodiment of the previously described embodiments of the vacuum cleaner filter bag according to the invention, the at least five folds form at least one surface folding, whereby the maximum height of the surface folding is less before the first operation of the vacuum cleaner filter bag in a vacuum cleaner than the maximum width of the surface folding corresponding to the maximum height. How the terms maximum height and maximum width are hereby to be measured will be explained below in detail.

An advantage of the previously described further embodiment is that in spite of an enlargement of the surface of the first and/or of the second bag wall, these bag walls always still remain sufficiently flexible, so that the vacuum cleaner bag can adapt optimally to the installation space in the vacuum cleaner.

According to another preferred further embodiment, cumulatively or alternatively to the previously described further embodiment, a vacuum cleaner filter bag can also be provided in which before the first operation of the vacuum cleaner filter bag in a vacuum cleaner, each of the at least five folds has a length that is greater than a third of the total extension of the vacuum cleaner filter bag in the direction of the fold, preferably greater than half of the total extension of the vacuum cleaner filter bag in the direction of the fold, and most preferably corresponds to the total extension of the bag in the direction of the fold. The folds, meaning particularly the fold axes, of the nonwoven material can consequently run from a first side, formed by the edge or the seam, of the vacuum cleaner filter bag to a second side of the vacuum cleaner filter bag, said second side lying opposite the first side and being formed by the edge or the seam. An edge or a seam of the vacuum cleaner filter bag can hereby be formed in particular by a weld seam. The folds, particularly fold axes, of the nonwoven material can hereby be formed in a straight line.

The fold axes of the folds can also particularly be formed in such a way that they have no area in which the nonwoven material is melted or in any way plastified, particularly such that they are not formed by a weld seam.

By means of this further embodiment, a very flexible vacuum cleaner filter bag is likewise obtained that can adapt optimally to the installation space in the vacuum cleaner.

According to another further embodiment of the invention, the folds of the first and/or of the second bag wall can have a fold height between 3 mm and 100 mm, particularly between 3 mm and 50 mm, particularly between 5 mm and 15 mm. The fold height can also be greater than 100 mm. This can particularly be the case in the event of large (volume of more than 10 liters), particularly commercially used, vacuum cleaner filter bags.

The folds of the first and/or of the second bag wall can furthermore have a fold width between 3 mm and 100 mm, particularly between 3 mm and 50 mm, particularly between 5 mm and 15 mm. The fold width can also be greater than 100 mm. This can particularly be the case in the event of large (volume of more than 10 liters), particularly commercially used, vacuum cleaner filter bags.

At least two folds of the first and/or of the second bag wall can have fold heights and/or fold widths and/or fold shapes that are different from one another. Alternatively, a plurality or all of the folds of the first and/or of the second bag wall can have equal fold heights and/or fold widths.

Another further embodiment of the invention provides for a plurality of folds to be provided that are distributed, preferably essentially uniformly, across the first and/or the second bag wall.

In this way, it is possible to implement a maximum increase in the surface of the filter material of the first and/or of the second bag wall by means of surface foldings.

The vacuum cleaner filter bag can also have, in addition to the surface folding on the first and/or second bag wall, a side folding.

A particularly preferred side folding results if the bag wall areas from which this side folding is formed likewise has folds that preferably run at an angle greater than 45°, most preferably at an essentially right angle, to the side folding.

In addition to an additional increase in the surface of the filter material in the area of the side folding, this further embodiment also can be more simply implemented in terms of production. The entire filter material can consequently be provided with folds or foldings without it being necessary to except from this the areas from which the side folding should be formed.

The folds and foldings of the first and/or of the second bag wall can have any shape. In particular, the fold legs can also be curved.

The so-called dovetail folding represents a preferred folding. Particularly to be understood as a folding with a dovetail shape is a sequence of four folds with the following configuration. The first leg of the first fold and the second leg of the fourth fold run parallel to the bag wall, and the second leg of the second fold, which is identical to the first leg of the third fold, likewise runs parallel to the bag wall. The second leg of the first fold is identical to the first leg of the second fold and the second leg of the third fold is identical to the first leg of the fourth fold. Such a folding is described in detail below in association with FIG. 10.

The folds or foldings of the first and/or of the second bag wall can each comprise fold legs of different lengths. An edge at which the fold legs come together, particularly the fold axis, can be formed by a folded line.

In principle, all materials known for the manufacture of vacuum cleaner filter bags come into consideration as materials for the bag wall, particularly for the folded nonwoven material.

A dry- or wet-laid nonwoven or an extrusion nonwoven, particularly a meltblown nonwoven or spunbond nonwoven can be used as the nonwoven material. Additional nanofibre layers can also be present. The differentiation between wet-laid nonwovens and conventional wet-laid paper is made according to the definition given below, such as is used by the International Association Serving the Nonwovens and Related Industries (EDANA). A conventionally known (filter) paper is consequently not a nonwoven.

The nonwoven can comprise staple fibres or endless fibres. In terms of manufacturing, it is also possible to provide a plurality of layers of staple fibres or endless fibres that are compacted into exactly one layer of nonwoven.

For example, the bag wall, particularly the folded nonwoven material, can comprise a laminate of spunbond nonwoven and meltblown nonwoven (SMS, SMMS, or SnxMS). This laminate can be laminated by means of a hot adhesive or it can be calendered. The layer made of meltblown nonwoven can be creped.

The term nonwoven is used in accordance with the definition given in the ISO standard ISO 9092:1988 and the CEN standard EN29092, respectively. In particular, the terms fibrous web or fleece and nonwoven in the field of the manufacture of nonwovens are distinguished from one another as follows, and are also to be understood in this way in the context of the present invention. Fibres and/or filaments are used to manufacture a nonwoven. The loose or unattached and still unbonded fibres and/or filaments are called fleece or fibrous web. A so-called fleece binding step turns such a fibrous web into a nonwoven that has sufficient strength in order, for example, to be wound up into rolls. In other words, a nonwoven is formed by means of the compaction to be self-supporting. (Details on the use of the definitions and/or methods described herein can also be found in the standard work "Vliesstoffe", W. Albrecht, H. Fuchs, W. Kittelmann, Wiley-VCH, 2000/"Nonwoven Fabrics", W. Albrecht, H. Fuchs, W. Kittelmann, Wiley-VCH, 2002.)

The nonwoven material can have (before the folds are introduced) a mass per unit area of less than 250 g/m$^2$, particularly less than 200 g/m$^2$, particularly between 25 g/m$^2$ and 150 g/m$^2$ for vacuum cleaner filter bags for household use.

The nonwoven material can also have (before the folds are introduced) a mass per unit area of greater than 250 g/m$^2$. This can be advantageous particularly for commercial vacuum cleaner filter bags, depending on the mechanical requirement.

According to another further development of the present invention, a fixing device can be provided that prevents at least one of the at least five folds from unfolding completely.

The folds of a bag wall can be connected at least partially to one another by means of a fixing device. Folds of the first and/or of the second bag wall can also be held at a predetermined distance from one another by means of the fixing device.

The fixing device can comprise at least one material strip, particularly a nonwoven material strip, or it can consist of at least one material strip, particularly at least one nonwoven material strip. A plurality of material strips can be arranged at a distance to one another or they can border one another directly.

A plurality of material strips can run crosswise, particularly perpendicularly or at a predetermined angle, to the longitudinal direction of the folds. The predetermined angle can be greater than 0° and less than 180°, particularly greater than 30° and less than 150°.

The fixing device is preferably arranged on the upstream side with reference to the bag wall. On the upstream side here means facing towards the interior of the vacuum cleaner filter bag. The fixing device can be connected at least partially to the bag wall, particularly to the folds of the first and/or of the second bag wall, particularly directly connected, particularly glued and/or welded. The fixing device can furthermore be glued and/or welded at points at which fold legs of two different folds of the first and/or of the second bag wall abut.

The fixing device can be glued and/or welded to the bag wall in one or more areas of the bag wall, whereby each of these areas is arranged between two folds of the first and/or of the second bag wall. Particularly in the case of reclined folds that do not overlap one another, this makes it possible to achieve simple manufacturing of the vacuum cleaner filter bag.

It is also possible to connect two or more folds of the first and/or of the second bag wall to one another by means of the fixing device, while two or more folds of the first and/or of the second bag wall are not connected to one another by means of the fixing device.

Alternatively or additionally, the fixing device can be glued and/or welded to one or more folds of a bag wall in such a way that the connection detaches during the operation of the vacuum cleaner filter bag. In this way, it is possible to influence the airflow within the vacuum cleaner filter bag by means of the at least partially detaching fixing device. In other words, parts of the fixing device can be used as air distributors during the operation of the vacuum cleaner filter bag.

Additionally or alternatively to the described further embodiments, the vacuum cleaner filter bag can comprise at least one element for flow deflection or flow distribution in the vacuum cleaner filter bag, particularly whereby the element can move in the airflow of the air flowing into the vacuum cleaner filter bag. An element of this kind is known, for example, from EP 1 787 560 or EP 1 804 635. For example, such an element can be formed in the form of at least one material strip mounted on the bag wall in the interior of the vacuum cleaner filter bag, or it can comprise such a material strip. For example, such an element can correspond to at least one material strip made of a nonwoven or filter paper or it can comprise at least one material strip made of a nonwoven or filter paper. The at least one material strip can be at least partially slit.

In particular, such an element can be formed in the form of at least one material strip mounted in the interior of the vacuum cleaner filter bag on a side of the bag wall lying opposite the inlet opening of the vacuum cleaner filter bag. The at least one material strip can be connected, particularly directly, to the folded bag wall. This can make it possible for the at least one material strip to move well in the airflow of the air flowing into the vacuum cleaner filter bag, because the air above the fold core can reach at least one fold below the at least one material strip.

The fixing device can be formed in such a way that the fold width and/or the distance between the folds or foldings that are connected to one another by means of the fixing device is kept essentially constant during the operation of the vacuum cleaner filter bag.

Alternatively or additionally, the fixing device can have a predetermined expansion behaviour. In this way, it is possible to achieve a better fitting of the vacuum cleaner filter bag to the installation space in the vacuum cleaner during operation.

A predetermined expansion behaviour should hereby be understood to mean that the length of the fixing device can be changed, particularly increased, in the direction of tension of an acting force.

In other words, the fixing device can be formed in such a way that the width of the folds or of the foldings and/or their distance apart from one another can be increased during the operation of the bag by means of a change of an extension of the fixing device in at least one direction, particularly in a direction perpendicular to the longitudinal direction of the folds. In this way, it is possible to achieve that the installation space in the vacuum cleaner is utilized as fully as possible during the operation of the vacuum cleaner filter bag.

The change in the extension can particularly correspond to an increase in the extension or length of the fixing device.

The change in the extension can be achieved by means of a stretching of the material of the fixing device.

Alternatively or additionally, the change in the extension can be achieved by means of a geometric deformation of the fixing device. For example, the fixing device can be formed in the form of a net, whereby the form or geometric shape of the mesh of the net can be changed upon application of a tensile load.

The fixing device can also be creped, whereby the creping runs parallel to the folds of the first and/or of the second bag wall. In this way, it is possible to achieve a change in the extension of the fixing device during the operation of the vacuum cleaner filter bag.

The fixing device can also be at least partially folded, particularly whereby the folds run parallel to the folds of the first and/or of the second bag wall. The change in the extension of the fixing device to be achieved can be determined by the fold height of the folds of the fixing device.

The fixing device can have an elasticity that is selected in such a way that the fixing device returns to its original form after the operation of the vacuum cleaner filter bag, meaning after the vacuum cleaner has been switched off. In this way, the change in the extension of the fixing device can be arranged so that it is reversible.

The fixing device can also be formed partially, particularly in subareas, by expandable material strips and partially, particularly in other subareas, by non-expandable material strips. In this way, it is possible to adapt the vacuum cleaner filter bag to the installation space in a vacuum cleaner.

The material of the fixing device can have a high level of air permeability. If the material of the fixing device is not permeable to air, the fixing device can be formed such that it is perforated or slit.

The fixing device can be formed in the form of at least one continuous adhesive strip. In particular, a hot-melt adhesive can be used as the adhesive.

The fixing device can be executed in the form of a continuous or discontinuous weld seam.

The at least one material strip can have a width of 0.5 cm to 4 cm, particularly 1 cm to 3 cm, for example, 2 cm. The at least one material strip can have a thickness of 0.1 mm to 10 mm, particularly 0.3 mm to 4 mm.

The fixing device can be formed in the form of one or two material strips, whose width and/or length corresponds to the width and/or length of the bag wall. In other words, the fixing device can be formed across the entire surface.

The fixing device can comprise a nonwoven material, a foil and/or a paper.

Spunbond nonwovens, carded or air-laid nonwovens and/or laminates of a plurality of nonwovens, for example, are possible for the nonwoven material for the fixing device. In the case of laminates of a plurality of nonwovens, the different nonwoven layers can have a gradient in the pore diameter.

The fixing device can also be formed in the form of a weave or a net. In particular, the fixing device can be formed in the form of an extruded net. The mesh width of the net can thereby lie between 0.5 mm and 10 cm, particularly between 3 mm and 6 mm. The shape of the holes of the net can be square or rectangular. It is also possible for one or more holes of the net to be square and one or more holes of the net to be rectangular.

The fixing device can also comprise filaments, cables and/or yarns.

The fixing device can be arranged parallel to the bag wall, particularly parallel to an outer surface of the bag wall. Here a surface in which the fold axes of the folds of the first and/or of the second bag wall lie, or a surface parallel to this, can be understood as an outer surface of the bag wall.

The fixing device can also correspond to or comprise a retaining plate of the vacuum cleaner filter bag. In other words, the folds of the first and/or of the second bag wall can be at least partially connected to one another by means of the retaining plate of the vacuum cleaner filter bag.

A nonwoven material of the fixing device can (optionally before a folding) have a mass per unit area of from 5 g/m$^2$ to 250 g/m$^2$.

The fixing device can also be executed as a prefilter layer. In other words, the fixing device itself can be formed as a filter layer. In this case, the mass per unit area of the fixing device can be less than 200 g/m$^2$. For example, the fixing device can correspond to a laminate of one or more spunbond nonwovens and of one or more meltblown nonwovens, particularly whereby the at least one meltblown nonwoven comprises electrostatically charged fibres.

Fibres and/or absorbents can be arranged in a hollow space (fold core) formed by the fixing device and the fold legs of at least one fold of the nonwoven material. The fibres can, in particular, be electrostatically charged fibres. In this way, it is possible to achieve a further filter effect. The fibres can be coated. Possible for use as absorbents are, for example, porous polymers and/or activated charcoal. Absorbents on the basis of coated polymer fibres are disclosed, for example, by DE 10 2004 009 956 and EP 1 725 153. Possible for use as a porous polymer is, for example, network SDVB (styrene-divinyl benzene). Also possible for use as absorbents are impregnated active charcoal, functionalized carbon, hydrophobic zeolites, hydrophobic, porous polymers, bentonites and/or crystalline organometallic complexes.

By means of a predetermined combination of one or more areas of the nonwoven material in which the folds are not fixed, and one or more areas of the nonwoven material in which the folds are fixed, it is possible to optimize a fitting to the geometric shape of an installation space of a vacuum cleaner.

To manufacture one of the vacuum cleaner filter bags described above, a nonwoven web of meltblown nonwoven can already be put down on an at least partially structured surface during the manufacturing process. In this way, a nonwoven web of a nonwoven material provided at least partially with foldings can be formed.

The bag wall, particularly the folded nonwoven material and/or the fixing device, can be at least partially electrostatically charged. It is possible to electrostatically charge the fibres of the nonwoven material before the compaction and/or to electrostatically charge the nonwoven, meaning after the compaction.

The electrostatic charge can, for example, be achieved by means of a corona method. The fleece or the nonwoven is thereby guided along between two direct current electrodes for a corona discharge centred in a roughly 3.8 cm (1.5 inches) to 7.6 cm (3 inches) wide area. One of the electrodes can thereby have a positive direct voltage of 20 to 30 kV while the second electrode has a negative direct voltage of 20 to 30 kV.

Alternatively or additionally, the electrostatic charge can be generated in accordance with the teachings of U.S. Pat. No. 5,401,446.

The vacuum cleaner filter bag can particularly be a disposable vacuum cleaner filter bag.

The vacuum cleaner filter bag can be formed in such a way that the installation space utilization of the vacuum cleaner filter bag during operation is greater than 65%, particularly greater than 80%.

Understood as installation space utilization here is the ratio of the maximum usable volume of the dust area of the vacuum cleaner filter bag during operation to a theoretical volume of the installation space of the vacuum cleaner that is used.

The installation space utilization can be influenced by means of the appropriate selection of one or more characteristics of the nonwoven material and/or of a used fixing device.

Definition of Terms and Parameters and Measurement Methods Used

The terms and parameters used above and in the following are defined in the following and measured with the following methods.

In the context of the present invention, each fold is always defined by two fold legs and one fold closure. The length of the fold closure defines the length of the fold in such a fold.

In the context of the present invention, a folding is a sequence of two or more folds.

A side folding is a sequence of folds in the area of the side edge of the vacuum cleaner filter bag. The seam along the relevant side edge of the vacuum cleaner filter bag is hereby a part of one of the folds forming the side folding; for example, the seam in the area of the relevant side edge is a fold closure or the seam lies almost completely in a fold leg.

A surface folding is a sequence of folds that is provided on the bag wall. A surface folding of this kind is fixed along a side edge in all events by a part of the seam. This part of the seam is, however, neither a fold closure nor a component of the fold leg of a fold of the folding.

The air permeability is determined in accordance with DIN EN ISO 9237:1995-12. In particular, work is carried out with a differential pressure of 200 Pa and a test area of 20 cm². The air permeability test device FX3300 of Texttest AG was used to determine the air permeability.

The mass per unit area is determined in accordance with DIN EN 29073-1:1992-08. The method according to the standard DIN EN ISO 9073-2:1997-02 is used for determining the thickness of one or more nonwoven layers, whereby method A is used.

The penetration (NaCl permeability) is determined by means of a TSI 8130 test device. In particular, 0.3 µm of sodium chloride is used at 86 l/min.

The width of a surface folding consisting of a plurality of folds and located in the first and/or the second bag wall is defined for a predetermined cross-section through the folding as a projection of the maximum extension of the surface folding onto the bag wall plane.

The height of a surface folding consisting of a plurality of folds and located in the first and/or the second bag wall is defined for a predetermined cross-section through the folding as a projection of the maximum extension of the surface folding onto the normal to the bag wall plane.

The maximum height of a surface folding is hereby defined as the greatest height of the surface folding along its entire length.

The maximum width of a surface folding corresponding to the maximum height is the greatest width which the surface folding has in the plane which contains the maximum height and runs perpendicularly to the axis of the surface folding.

FIGS. 13a to 13d give explanatory examples for determining the maximum height and the maximum width of a surface folding. Shown in each case is a cross-section through a surface folding in the plane in which the maximum height of the fold lies along its length, whereby said plane runs perpendicularly to the fold axis. The maximum height $H_{max}$ and the maximum width $W_{max}$ are drawn into this cross-section. In the examples according to FIGS. 13a to 13c, surface foldings are shown whose maximum height is less than the maximum width; FIG. 13d shows a surface folding whose maximum height is greater than the maximum width. The foldings shown in FIGS. 13a to 13d are all upright foldings. A reclined folding would be obtained if one were to allow the height of the folding $H_{max}$ in FIG. 13b to approach zero.

The maximum usable volume of the dust area of the vacuum cleaner filter bag is determined in accordance with DIN EN 60312-1:2009. The theoretical volume of the installation space of the vacuum cleaner can be calculated from the geometric data of the installation space, particularly whereby the space between ribs present in the installation space, said ribs being used to support the vacuum cleaner filter bag spaced at a distance from the wall surface of the installation space of the vacuum cleaner, is not calculated into the theoretical volume.

The theoretical volume of the installation space can, for example, be determined by means of having a computer lay a surface in a computer model of the installation space that lies, particularly directly, on the inner wall surface of the installation space. If the installation space has ribs that are used to support the vacuum cleaner filter bag and space it at a distance from the wall surface of the installation space of the vacuum cleaner, the surface can also correspond to a surface parallel to the inner wall surface that lies, particularly directly, on the upper edges of these ribs. The volume enclosed by this surface can correspond to the theoretical volume of the installation space.

DESCRIPTION OF THE FIGURES

Further characteristics and advantages of the invention are explained in the following on the basis of explanatory figures. Shown are.

DETAILED DESCRIPTION OF THE INVENTION ON THE BASIS OF PREFERRED EXAMPLES

Figure 1:
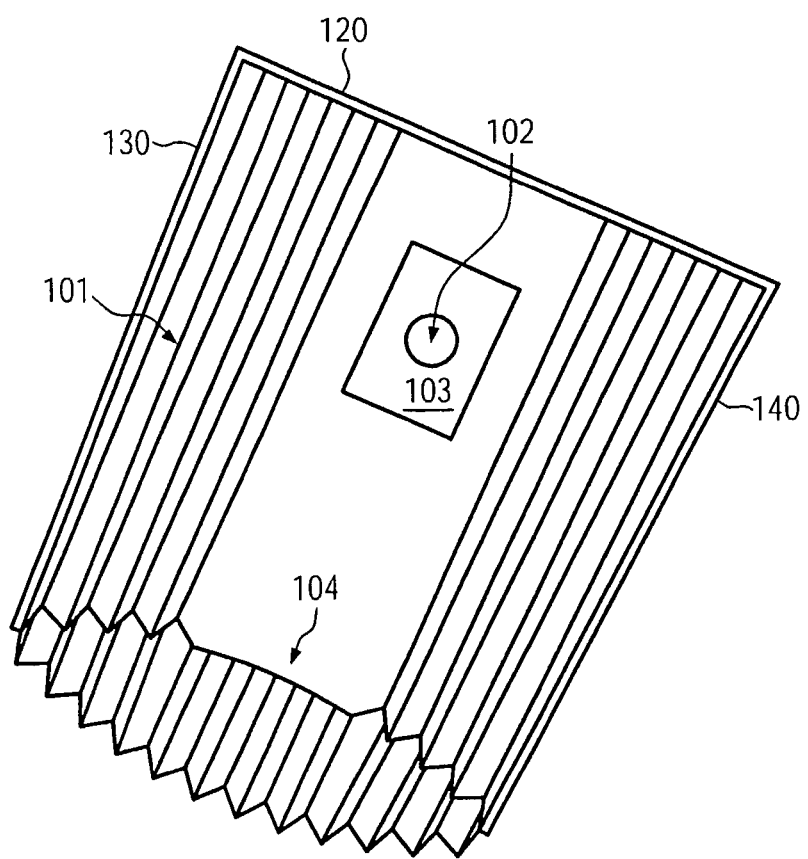
FIG. 1 an exemplary vacuum cleaner filter bag.

FIG. 1 shows an exemplary vacuum cleaner filter bag in the form of a flat bag in which one side is shown opened for purposes of illustration. In fact, a weld seam is to be found in the area of the side that is shown here opened.

The exemplary vacuum cleaner filter bag of FIG. 1 comprises a first and a second bag wall of folded nonwoven material. The first and the second bag wall are connected to each other by means of four weld seams. FIG. 1 shows three of these four weld seams 120, 130, and 140. The folded nonwoven material comprises a plurality of, particularly more than two, folds 101. The folds 101 here form upright foldings.

The exemplary vacuum cleaner filter bag of FIG. 1 furthermore comprises an inlet opening 102 through which the air that is to be cleaned can flow into the vacuum cleaner filter bag, as well as a retaining plate 103 that is used to fix the vacuum cleaner filter bag in a chamber of a vacuum cleaner, and that has a through hole in the area of the inlet opening 102.

The folds 101 in the exemplary vacuum cleaner filter bag of FIG. 1 are formed along the entire length of the vacuum cleaner filter bag. Depending on the orientation of the retaining plate 103, the vacuum cleaner filter bag can have a long side and a broad side. The folds 101 can extend along the long side or along the broad side, particularly along the entire long side or broad side.

In the case of the exemplary vacuum cleaner filter bag of FIG. 1, an area 104 of the bag wall is free of folds. Alternatively, folds of the first and/or of the second bag wall can, however, also be located on the entire bag wall.

The bag wall can particularly have two or more filter layers, whereby at least one layer comprises the folded nonwoven material.

Figure 2:
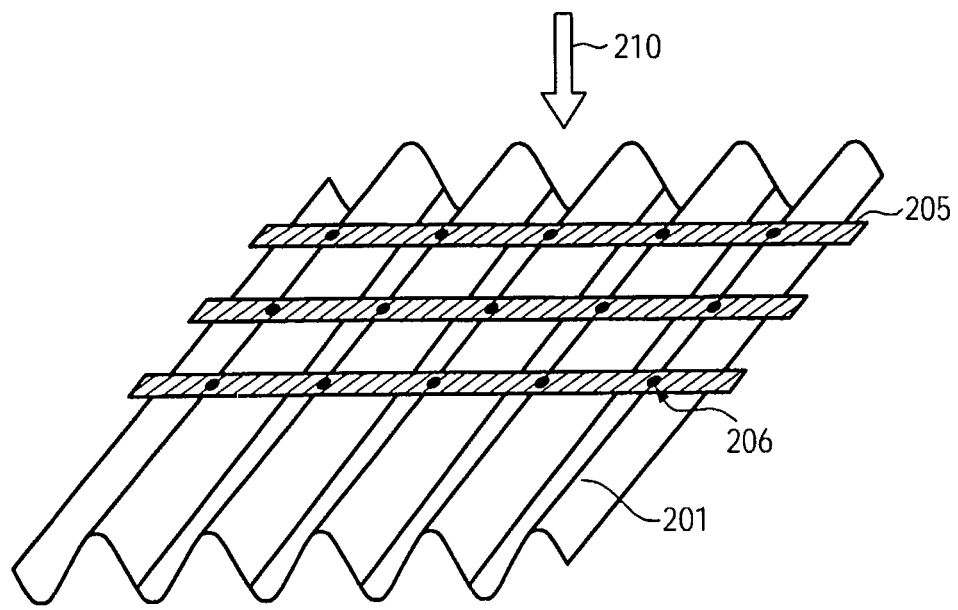
FIG. 2 a diagonal view of the interior of an exemplary vacuum cleaner filter bag.

FIG. 2 shows a diagonal view of an interior of a bag wall of an exemplary vacuum cleaner filter bag. In this example, the folds 201 of the nonwoven material are connected to one another by means of a fixing device in the form of a plurality of material strips 205. In particular, the folds 201 are held at a predetermined distance from one another by means of the material strips 205.

In other words, the fold width of the folds 201 is set by the material strips 205. The material strips 205 are connected, for example, glued or welded, to the folds 201, particularly to an edge of the folds 201, at connection points 206. The arrow 210 indicates the flow direction of the air to be cleaned through the nonwoven material.

The material strips 205 can, for example, have a width of from 0.5 cm to 4 cm, particularly from 1 cm to 3 cm, for example, 2 cm.

The material strips 205 can comprise a nonwoven material. In particular, the nonwoven material can comprise an extrusion nonwoven, for example, a spunbond nonwoven and/or a carded or air-laid nonwoven. The material strips 205 can also comprise a laminate of a plurality of nonwovens, particularly a laminate of spunbond nonwoven—meltblown nonwoven—spunbond nonwoven.

The mass per unit area of the material strips 205 can be less than 250 g/m², particularly between 10 g/m² and 30 g/m².

Some of the connection points 206 can be formed in such a way that the connection detaches during the operation of the vacuum cleaner filter bag. The flow behaviour of the air flowing into the bag can be influenced by means of the at least partially detached material strips 205.

The material strips 205 can also have a predetermined expansion behaviour. In this way, it is possible to achieve a predetermined expansion of the bag during operation. The material strips 205 can also have elasticity, so that the expansion of the bag can be reduced by elastic restoring forces again after operation, meaning after the vacuum cleaner has been switched off. In this way, dust can also be conveyed from the bag wall into the interior of the vacuum cleaner filter bag.

Alternatively to a plurality of material strips 205, the fixing device can also be formed as a material strip across the entire surface. In this case, the fixing device can have a high level of air permeability, particularly more than 5000 l/(m² s).

The fixing device can also comprise an air-permeable paper, weave and/or a foil. To increase the air permeability, the fixing device can also be perforated or slit.

Figure 3:
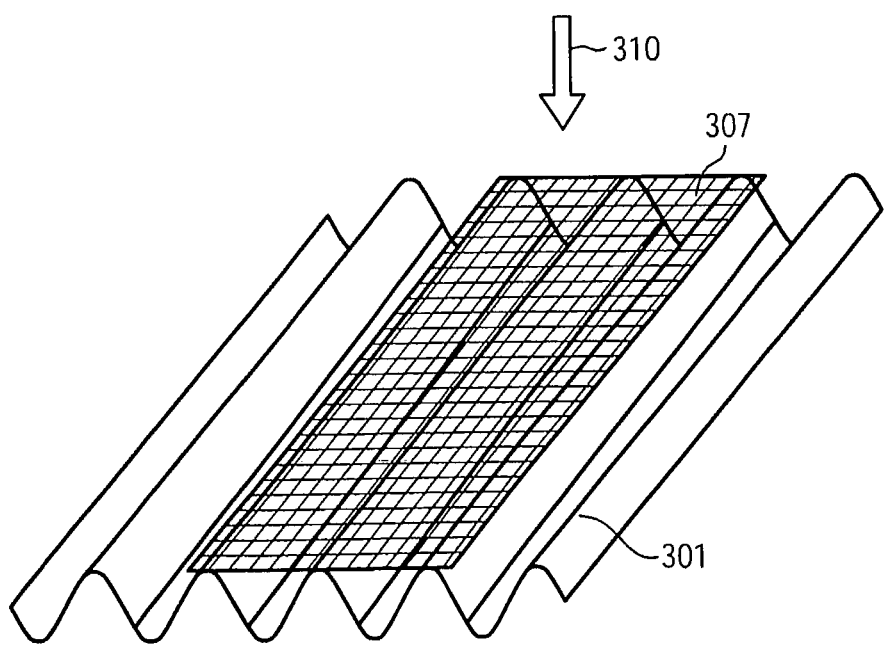
FIG. 3 a diagonal view of an interior of a further exemplary vacuum cleaner filter bag.

FIG. 3 shows a diagonal view of an interior of a bag wall of a further exemplary vacuum cleaner filter bag. In this case, the fixing device is formed in the form of a net 307 that connects the folds 301 of the pleated nonwoven material to one another in a subarea of the surface. In other areas of the surface, the folds of the first and/or of the second bag wall are not connected by the fixing device. By means of a partial fixing of the folds of this kind, it is possible to achieve an optimal fitting of the vacuum cleaner filter bag to the installation space of the vacuum cleaner during operation. The arrow 310 indicates the direction of flow through the nonwoven material of the air that is to be cleaned.

Figure 4:
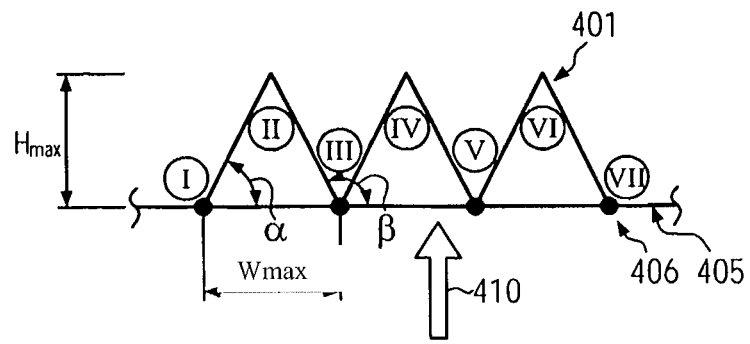
FIG. 4 a cross-section through a subarea of an exemplary vacuum cleaner filter bag.

FIG. 4 shows a cross-section through a subarea of the bag wall of an exemplary vacuum cleaner filter bag, whereby the cross-section runs perpendicularly to the run of the folds of the first and/or of the second bag wall. In particular, FIG. 4 shows a zigzag folding comprised of three foldings 401 that comprises seven folds I-VII. The folds I, III, V and VII are connected to one another by means of a fixing device 405. In particular, the fixing device 405 is connected to the fold closures of these folds at connection points 406. The arrow 410 indicates the direction of flow of the air that is to be cleaned to the bag wall. In this example, the fixing device 405 is consequently on the upstream side with reference to the bag wall.

FIG. 4 furthermore shows the fold width $W_{max}$ and the fold height $H_{max}$ of the foldings. The fold height and/or the fold width can lie between 3 mm and 100 mm, particularly between 5 mm and 15 mm. The foldings are upright foldings; the one part of the fold leg hereby has an angle $\alpha$ of roughly 64°, and the other part of the fold leg has an angle $\beta$ of roughly 116°.

Figure 5:
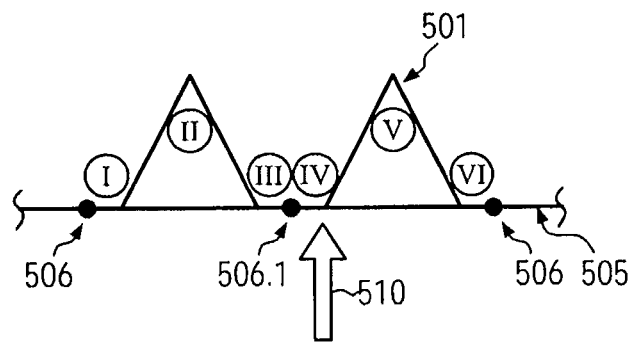
FIG. 5 a cross-section through a subarea of a further exemplary vacuum cleaner filter bag.

FIG. 5 shows a further cross-section through a part of a bag wall of an exemplary vacuum cleaner filter bag. In particular, shown in the detail are two foldings 501 made of six folds I-VI, and a fixing device 505 arranged on the upstream side with regard to the direction of flow 510, whereby the fixing device is connected to the folds I, III or IV and VI at the connection points 506.

In FIG. 5, the connection point 506.1 is arranged in the area of the nonwoven material that forms the leg of the folds III and IV and that runs parallel to the bag wall.

The foldings of this vacuum cleaner bag accordingly have legs that run parallel to the bag wall and that lie between the folds that stick out of the bag wall plane. In particular, the width of the parallel leg is hereby less than the width of the opening of the fold that sticks out of the bag wall.

In FIGS. 4 and 5, the foldings have a cross-section in the shape of isosceles triangles. The height of each of these foldings is therefore less than the corresponding width of the foldings.

Figure 6:
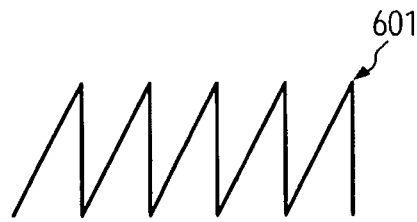
FIG. 6 a cross-section through a subarea of a further exemplary vacuum cleaner filter bag.

FIG. 6, for example, shows a cross-section through a subarea of a bag wall of an exemplary vacuum cleaner filter bag, in which the folds 601 have fold leg lengths that are different in the cross-section.

In particular when a full-surface, air-permeable fixing device is used for fixing the folds, the hollow spaces formed between the folds and the fixing device can be filled with fibres, particularly electrostatically charged fibres, and/or with absorbents. For example, coated fibres, activated charcoal and/or porous polymers can be used as absorbents.

Figure 7:
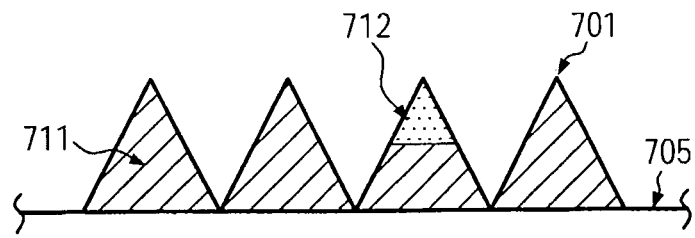
FIG. 7 a cross-section through a subarea of a further exemplary vacuum cleaner filter bag.

FIG. 7 consequently shows a cross-section of a subarea of such a bag wall. In particular, a plurality of folds 701 are shown that form triangular foldings. A fixing device 705 is attached to a part of the folds. Fibres 711 and/or activated charcoal 712 are arranged in the hollow spaces between the fold legs and the fixing device 705.

Figure 8:
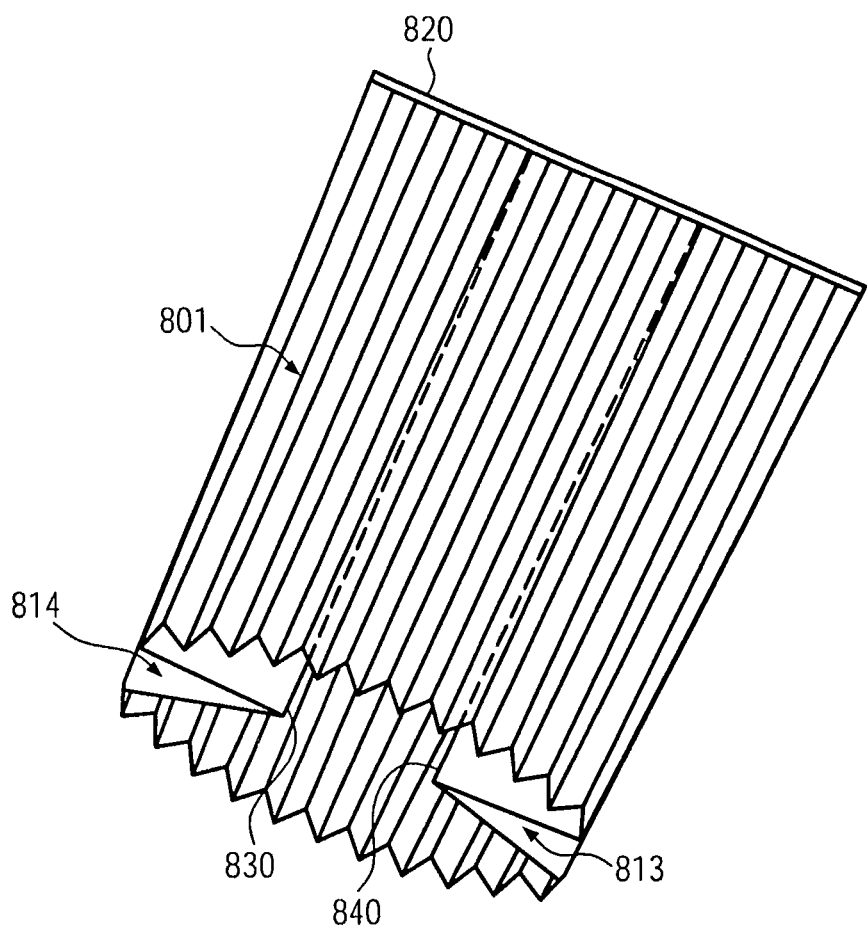
FIG. 8 a further exemplary vacuum cleaner filter bag with a side folding.

FIG. 8 shows an exemplary vacuum cleaner filter bag in the form of a flat bag in a top view onto an outer side of the vacuum cleaner filter bag. The upper and the lower bag wall comprise a multiplicity of folds 801. Three weld seams are indicated with the reference numbers 820, 830 and 840. As also in FIG. 1, FIG. 8 depicts a side that is opened for purposes of illustration. In fact, a weld seam, namely the fourth weld seam, is to be found in the area of the side that is shown here opened. The vacuum cleaner filter bag furthermore comprises two side foldings 813 and 814. The filter material is not folded in the area of the side foldings. It is possible for the side folds 813 and 814 to be partially or completely turned out.

According to a design that is not shown, the side foldings can also have folded filter material. In order to keep the folded filter material from unfolding when the side foldings are introduced, it is expedient to provide the side foldings at an angle to the folds that is greater than 45°. Assuming the vacuum cleaner filter bag shown in FIG. 8, in this case the side folding would be introduced in the area of the weld seam 820 and/or in the area of the weld seam that is not shown.

In FIGS. 1 and 4 to 8, the folds have a cross-section in the shape of a triangle. The folds can also have any other shape, however. In particular, the shape of the folds in the figures should be seen as only schematic. In particular, the fold legs can also be curved.

Figure 10A:
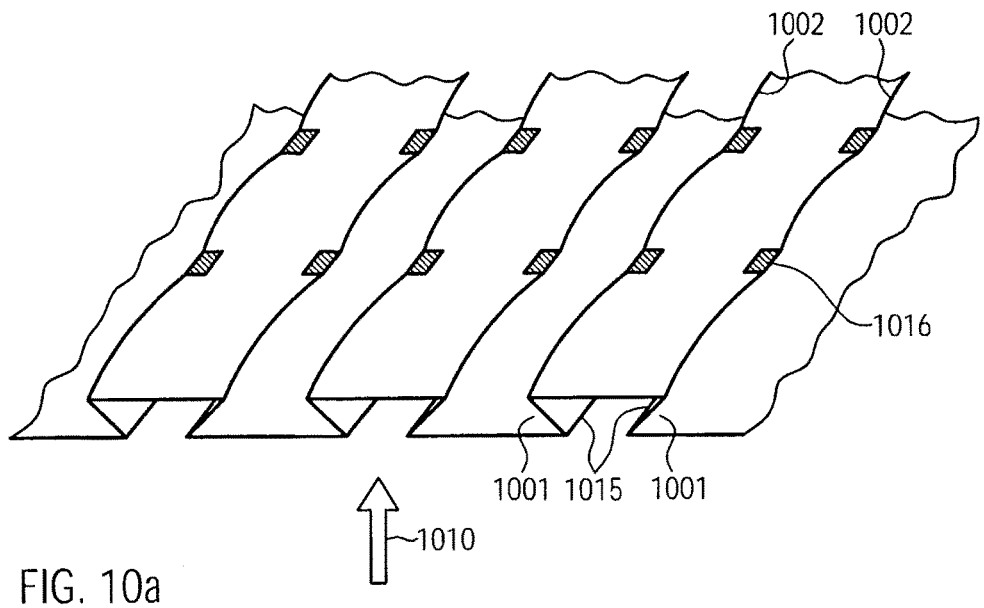
FIGS. 10a and 10b a cross-section through a subarea of an exemplary vacuum cleaner filter bag.
Figure 10B:
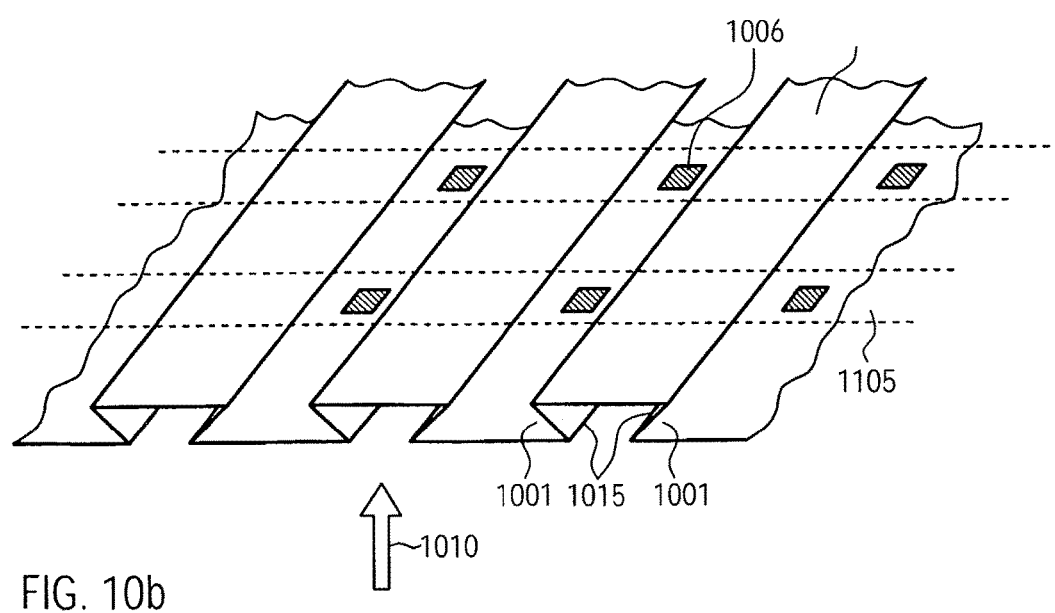

The fold shape of one or more folds and/or foldings of the first and/or of the second bag wall can have a dovetail shape perpendicular to the longitudinal axis of the folds in a cross-section. Examples of foldings with a dove tail shape in the cross-section are shown in FIGS. 10*a* and 10*b*. The edges 1015 of the fold legs of the folds 1001 that face toward the bag interior are thereby spaced a distance apart from one another. In this way, it is easy for the air that is to be cleaned to penetrate into the folding. The direction in which the air that is to be cleaned flows through the bag wall is illustrated by an arrow 1010.

In FIG. 10*a* each of the folds 1002 of the nonwoven material is connected, particularly by means of glue and/or welding, to the parallel legs of the folds 1001. The connection points 1016 thereby have a distance from one another in the longitudinal direction of the folds 1002 that is greater than ⅕, particularly greater than ¼, of the length of the fold 1002. In this way, the air that is to be cleaned can better flow through the folds 1002 during operation than if there were smaller distances between the connection points 1016.

According to a design that is not shown, the connection points 1016 can also lie on a continuous weld line.

In FIG. 10*b*, a fixing device 1105 in the form of a plurality of material strips is provided that is glued and/or welded to the at least folded nonwoven material with the fold legs of the folds 1001. A plurality of connection points 1006 are thereby shown in FIG. 10*b*.

Figure 11A:
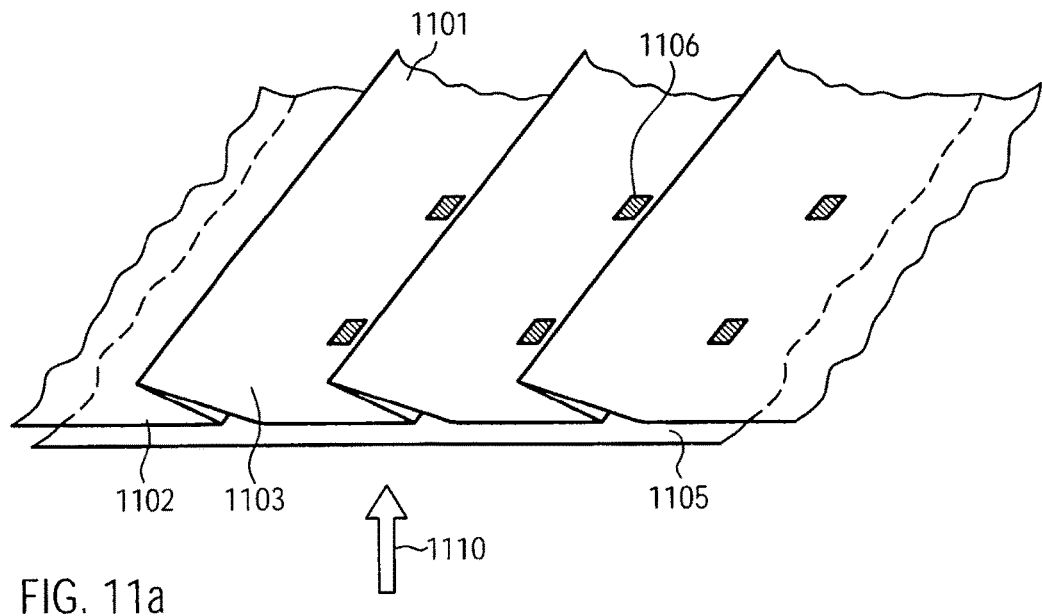
FIGS. 11a and 11b a cross-section through a subarea of a further exemplary vacuum cleaner filter bag.
Figure 11B:
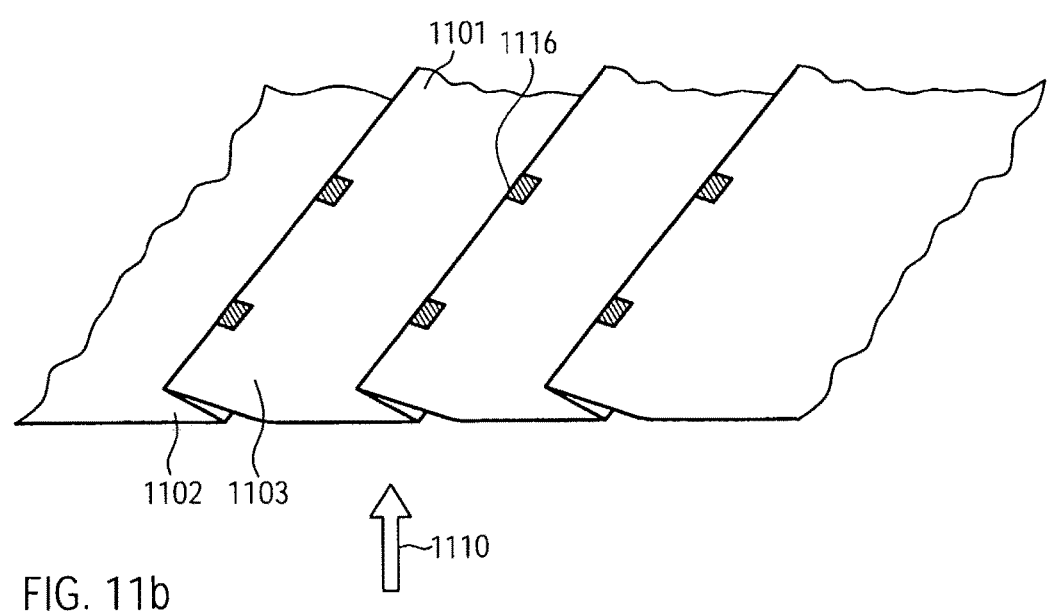
Figure 12A:
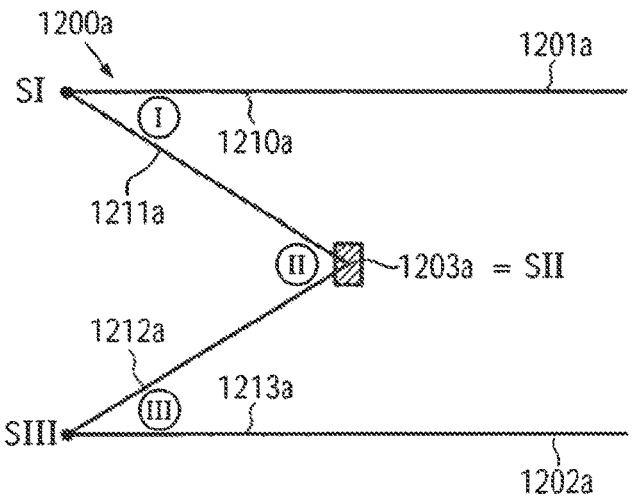
FIGS. 12a to 12c a cross-section through side foldings according to the state of the art.
Figure 12B:
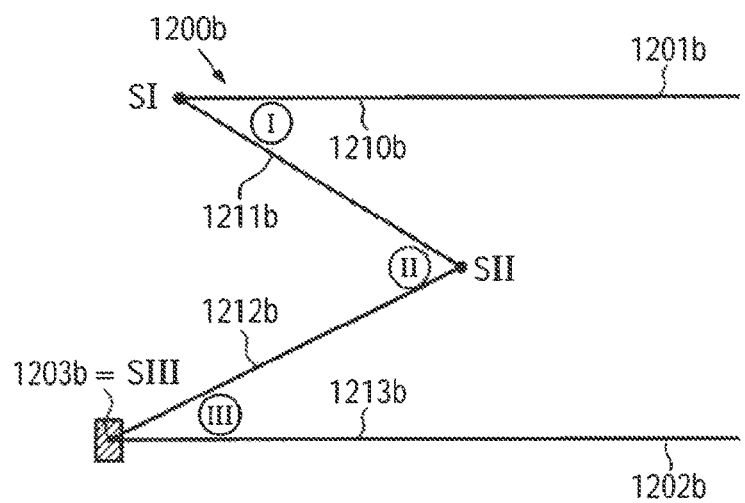
Figure 12C:
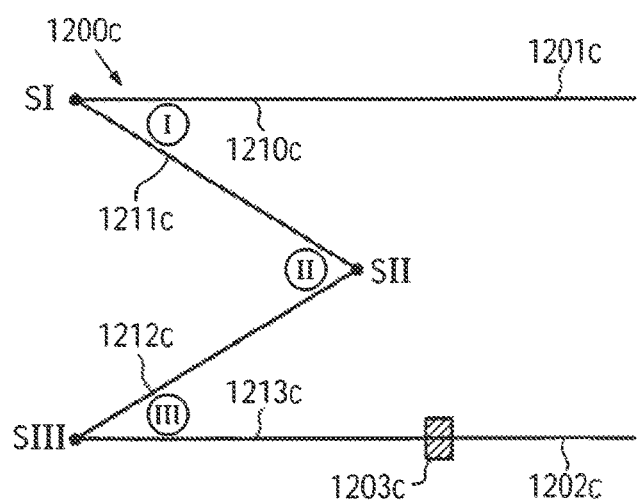
Figure 13A:
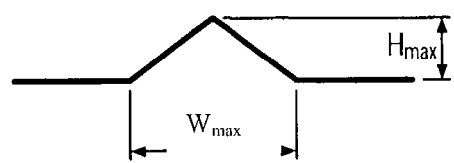
FIGS. 13a to 13d a cross-section through various foldings for explanation of the terms maximum fold height and maximum fold width.
Figure 13B:
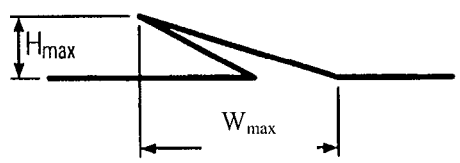
Figure 13C:
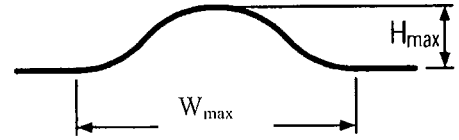
Figure 13D:
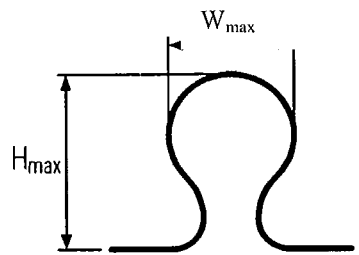

FIGS. 11*a* and 11*b* show further exemplary details of a bag wall with a nonwoven material with surface foldings. The foldings, which are formed from the folds 1101, 1102 and 1103 of the nonwoven material, are shown to be reclined in these examples, i.e., the fold legs run essentially parallel to the surface of the bag wall. Because fold legs that run essentially parallel to the surface cannot be drawn, the fold legs here were shown at an angle with reference to the surface of the bag wall.

FIG. 11*a* furthermore shows a fixing device 1105 that is connected, particularly glued and/or welded, to the nonwoven material that is given surface foldings in areas of the bag wall, whereby these form the fold legs of the folds 1101. The manufacture of the vacuum cleaner filter bag can be simplified by means of this type of connection of the fixing device. In particular, a plurality of connection points 1106 are shown between the fixing device and the bag wall.

The direction in which the air that is to be cleaned flows through the bag wall is furthermore illustrated in the form of an arrow 1110 in FIGS. 11*a* and 11*b*.

The fixing device 1105 is formed across the entire surface in FIG. 11*a*. The fixing device 1105 could however also be formed in the form of a plurality of material strips, such as is illustrated in FIG. 2.

According to a design that is not shown, the connection points 1106 can also lie on a continuous weld line that preferably runs parallel to the fold axes.

In FIG. 11*b*, each of the foldings 1101 of the nonwoven material is connected, particularly glued and/or welded, to the fold legs of the folds 1102, which is arranged between two fold edges of the bag wall. The connection points 1116 are thereby spaced apart from one another in the longitudinal direction of the folds 1101 at a distance that is greater than ⅕, particularly greater than ¼, of the length of the fold 1101. In this way, the air that is to be cleaned can better flow through the folds 1101 during operation than if the distances between the connection points 1116 were smaller.

According to a design that is not shown, the connection points 1116 can also lie on a continuous weld line that preferably runs perpendicularly to the fold axes.

Due to the use of a nonwoven material with surface foldings, the surface available for filtration can be enlarged given predetermined dimensions of the vacuum cleaner filter bag. This leads to a high filtration performance with a low starting pressure loss. This means a lower media passage speed, which increases the filtration performance, particularly by means of electrostatically-charged fibres of the bag wall.

It shall be understood that characteristics mentioned in the previously described embodiments are not limited to these special combinations and are also possible in any other combinations. In particular, the vacuum cleaner filter bag can be formed with different geometric shapes and/or sizes.

Measurement Results

Figure 9:
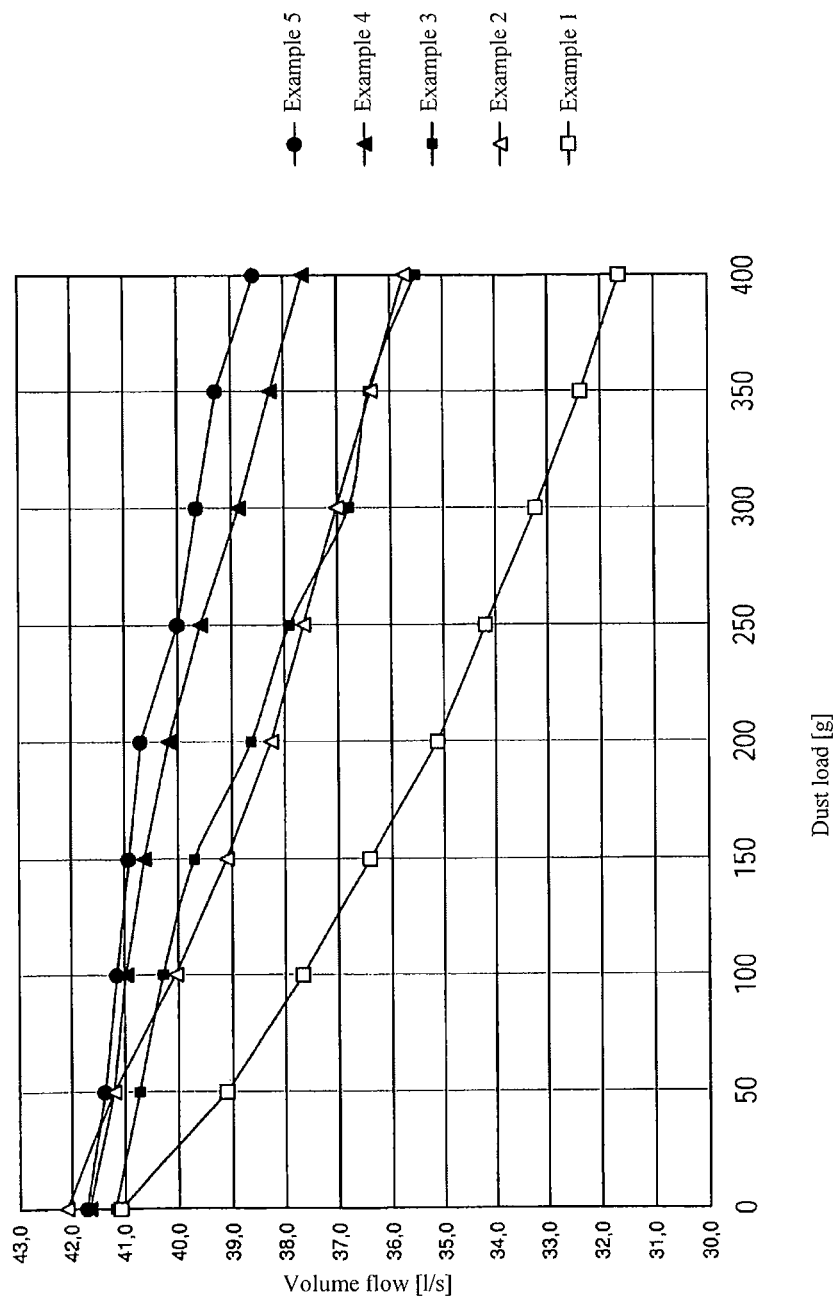
FIG. 9 an illustrative diagram in which the volume flow through the bag wall of exemplary vacuum cleaner filter bags in dependence on the dust mass stored therein is depicted.

FIG. 9 is used for illustration purposes, and shows a diagram in which the volume flow through the vacuum cleaner is depicted in dependence of the dust load (DMT-8 dust) in grams. The bag wall is an SMMS laminate, consequently consisting of an outer layer of spunbond (35 g/m$^2$), two layers of meltblown nonwoven (2×20 g/m$^2$) and an inner layer of spunbond (17 g/m$^2$). The corresponding measurements were made with a "Miele S 5210" model vacuum cleaner.

Example 1

Flat bag according to the state of the art. Bag dimensions: 300 mm×320 mm.

Example 2

Bag dimensions: (length×width): 300 mm×320 mm. Continuous longitudinal folds, uniformly distributed across the surface, were present on each the bag upper side and the bag lower side. In particular, the longitudinal folds were provided on each of the bag sides in the form of a zigzag folding, as is shown in FIG. 4 (a fixing device, as is shown in FIG. 4, was not, however, used in this Example 2). The zigzag folding had 20 folds opened towards the vacuum cleaner bag interior. The material width was 630 mm. The average height H$_{max}$ of the sequence of folds was 12 mm.

Example 3

Bag dimensions (length×width): 300 mm×320 mm. The same folding as in Example 2 was provided on the bag upper side and the bag lower side. Additionally, a full-surface fixing device in the form of a net with a mesh width of 5 mm×5 mm was present on the interior of the bag upper side and the bag lower side for this bag. This net was attached to the filter medium at 171 points corresponding to FIG. 3.

Example 4

Bag dimensions (length×width): 300 mm×320 mm. The same folding as in Example 2 was provided on the bag upper side and the bag lower side. Additionally, a fixing device in the form of nine strips each 20 mm wide was present on the interior of the bag upper side and the bag lower side for this bag. These strips were attached to the filter material at 171 points in accordance with FIG. 2.

Example 5

Bag dimensions (length×width): 300 mm×320 mm. The same folding as in Example 2 was provided on the bag upper side and the bag lower side. Additionally, a fixing device in the form of nine strips each 20 mm wide was present on the interior of the bag upper side and the bag lower side for this bag. These strips were attached to the filter material at 171 points in accordance with FIG. 2. An element for flow deflection was additionally present in the bag. This consisted of 14 strips, each 11 mm wide and having a mass per unit area of 110 $g/m^2$. The strips ran parallel to the folds of the bag upper side and bag lower side.

As can be seen in FIG. 9, the vacuum cleaner filter bags with a bag wall comprising a folded nonwoven material show a greater volume flow even in the case of high dust loads than does a vacuum cleaner filter bag with a bag wall without foldings in the nonwoven material.

In other words, the pressure loss increase of the vacuum cleaner filter bag is reduced due to the greater dust-holding capacity.

Table 1 shows average values (each from five measurements) of the measured pressure loss and of the measured penetration for two different filter media depending on the media passage speed. The high media passage speed hereby corresponds to an unfolded material; the low passage speed corresponds to a folded material. Filter medium 1 is an SMMS laminate made of an outer layer of spunbond (35 $g/m^2$), two layers of meltblown nonwoven (2×20 $g/m^2$) and an inner layer of spunbond (17 $g/m^2$). Filter medium 2 is an SMMMMS laminate made of an outer layer of spun bond (35 $g/m^2$), four layers of meltblown nonwoven (4×19 $g/m^2$) and an inner layer of spunbond (17 $g/m^2$).

TABLE 1

The different media passage speeds were adjusted by changing the volume flow on the TSI 8130. Work was conducted with test samples with a surface area of 100 $cm^2$.

| TSI 8130 | Media passage speed [cm/s] | Pressure loss ΔP [mm H$_2$O] | Penetration [%] |
| --- | --- | --- | --- |
| Filter medium 1 | 14.3 | 14.5 | 32.2 |
|  | 7.15 | 6.9 | 18.7 |
| Filter medium 2 | 14.3 | 32.1 | 0.025 |
|  | 7.15 | 15.5 | 0.004 |

As can be seen in Table 1, the pressure loss and the penetration for the filter medium and flow rate that correspond to a bag wall that has been given folds are considerably less than in the case of the filter medium and flow speed that correspond to the state of the art (unfolded). At the lower media passage speed, the pressure loss for the two observed filter media is only roughly half as great as at the high media passage speed.

For both filter materials, the filtration capacity improves, as expected, considerably at the lower media passage speed. The reduction of the penetration is disproportionately stronger for the filter medium 2 than for the filter medium 1, because in this case the effect of the electrostatic charge of the filter material has an even greater influence than in the case of the more open material 1.

It is possible to achieve an optimal fitting of the vacuum cleaner filter bag to the given installation space in the vacuum cleaner during operation by means of a bag wall with surface foldings. In particular, it is possible to achieve installation space utilization of greater than 65%. In particular, if no fixing device is provided for the folds of the first and/or of the second bag wall, installation space utilization of greater than 80% can be achieved.

Using flat bags such as they are known in the state of the art, normally installation space utilization of only 50% to 65% can be achieved.

The invention claimed is:

1. A vacuum cleaner filter bag with a first bag wall comprising a filter material and a second bag wall comprising a filter material, wherein the first and the second bag wall are connected to each other along their periphery such that the vacuum cleaner filter bag is completely closed, wherein the filter material of the first and of the second bag wall is formed from a nonwoven, wherein the vacuum cleaner filter bag has an inlet opening, through which the air to be cleaned can flow into the vacuum cleaner filter bag, the inlet opening is positioned on a surface of the first or the second bag wall, and a retaining plate, and wherein the first or the second bag wall has at least five folds; and further comprising a fixing device that prevents at least one of the at least five folds from unfolding completely and wherein the fixing device is arranged on a first side of the bag wall having at least five folds that is facing towards an interior of the vacuum cleaner filter bag and a second side of the bag wall having at least five folds on an exterior of the vacuum cleaner filter bag is free from any fixing device.

2. The vacuum cleaner bag according to claim 1, wherein fold legs of the at least five folds have inflection lines that run essentially straight.

3. The vacuum cleaner filter bag according to claim 1, wherein the at least five folds form at least one surface folding, wherein a maximum height of the surface folding before a first operation of the vacuum cleaner filter bag in a vacuum cleaner is less than a maximum width of the surface folding corresponding to the maximum height.

4. The vacuum cleaner filter bag according to claim 1, wherein before a first operation of the vacuum cleaner filter bag in a vacuum cleaner, each of the at least five folds has a length that is greater than one-third of a total extension of the vacuum cleaner filter bag in a direction of the fold.

5. The vacuum cleaner filter bag according to claim 1, wherein before a first operation of the vacuum cleaner filter bag in a vacuum cleaner, each of the at least five folds has a height between 3 mm and 100 mm.

6. The vacuum cleaner filter bag according to claim 1, wherein before a first operation of the vacuum cleaner filter bag in a vacuum cleaner, each of the at least five folds has a width between 3 mm and 100 mm.

7. The vacuum cleaner filter bag according to claim 1, wherein at least two of the at least five folds have heights or widths or shapes that differ from one another.

8. The vacuum cleaner bag according to claim 1, wherein a plurality of folds are provided that are distributed essentially uniformly across the first or the second bag wall.

9. The vacuum cleaner filter bag according to claim 1, furthermore comprising at least one side folding.

10. The vacuum cleaner filter bag according to claim 1, wherein the fixing device is glued or welded to the at least one fold or to the bag wall adjacent to the at least one fold.

11. The vacuum cleaner filter bag according to claim 1, wherein the fixing device comprises at least one material strip or wherein the fixing device has a predetermined expansion behaviour or a predetermined elastic behaviour.

12. The vacuum cleaner filter bag according to claim 1, wherein the fixing device is a nonwoven material layer, a net layer, a perforated foil or a fabric ply that extends across the entire first or second bag wall.

13. The vacuum cleaner filter bag according to claim 1, wherein fibers or absorbents are provided in a hollow space that is formed by the fixing device and fold legs of the at least one fold.

14. The vacuum cleaner filter bag according to claim 1, comprising installation space utilization during operation that is greater than 65%.

15. The vacuum cleaner filter bag according to claim 1, wherein before a first operation of the vacuum cleaner filter bag in a vacuum cleaner, each of the at least five folds has a length that corresponds to the total extension of the bag in a direction of the fold.

16. The vacuum cleaner filter bag according to claim 1, wherein before a first operation of the vacuum cleaner filter bag in a vacuum cleaner, each of the at least five folds has a width between 5 mm and 15 mm.

* * * * *